(12) United States Patent
El-Nakib

(10) Patent No.: US 10,410,219 B1
(45) Date of Patent: Sep. 10, 2019

(54) PROVIDING AUTOMATIC SELF-SUPPORT RESPONSES

(71) Applicant: EMC Corporation, Hopinkton, MA (US)

(72) Inventor: Eslam M. El-Nakib, Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 806 days.

(21) Appl. No.: 14/871,471

(22) Filed: Sep. 30, 2015

(51) Int. Cl.
| | |
|---|---|
| G06F 15/18 | (2006.01) |
| G06Q 30/00 | (2012.01) |
| G06F 16/93 | (2019.01) |
| G06F 16/951 | (2019.01) |

(52) U.S. Cl.
CPC ........... *G06Q 30/016* (2013.01); *G06F 16/93* (2019.01); *G06F 16/951* (2019.01)

(58) Field of Classification Search
CPC ... G05B 13/00; G06F 7/00; G06F 7/02; G06F 7/023; G06F 8/00; G06F 15/18; G06N 99/005; G06N 5/04; G06Q 30/016; G09C 1/00; G10L 15/26; H04M 3/5183
USPC ..................................................... 706/15, 45
See application file for complete search history.

(56) References Cited

U.S. PATENT DOCUMENTS

| | | | |
|---|---|---|---|
| 8,443,370 B2 | 5/2013 | Smith et al. | |
| 9,379,997 B1 | 6/2016 | Vosshall et al. | |
| 9,672,053 B2 | 6/2017 | Tang et al. | |
| 2007/0027687 A1* | 2/2007 | Turk | G10L 21/00 704/246 |
| 2008/0228744 A1* | 9/2008 | Desbiens | G06F 17/30743 |
| 2012/0016678 A1* | 1/2012 | Gruber | G06F 17/3087 704/275 |
| 2015/0074095 A1* | 3/2015 | Enders | G06F 17/27 707/725 |
| 2015/0142702 A1* | 5/2015 | Nilsson | G06N 5/048 706/11 |
| 2016/0239487 A1* | 8/2016 | Potharaju | G06F 17/3053 |

FOREIGN PATENT DOCUMENTS

JP        2000057066 A  *  2/2000

OTHER PUBLICATIONS

EMC Corp., Press Release, Dec. 11, 2012, https://www.emc.com/about/news/press/2012/20121211-01.htm.*
EMC Corp., Press Release, Dec. 11, 2012, https://www.emc.com/infographics/digital-universe-business-infographic.htm.*

* cited by examiner

Primary Examiner — David R Vincent
(74) Attorney, Agent, or Firm — BainwoodHuang

(57) ABSTRACT

Providing automatic initial responses to service requests. An automated support engine receives a service request including a problem description from a client. A text analysis component analyzes the problem description to identify an issue. A search component searches response reference sources to identify a set of suggested solutions and a set of reference materials associated with the issue. The response reference sources include structured data materials and unstructured data materials. The automated support engine combines the set of suggested solutions and a set of links corresponding to the set of reference materials to generate an automatic initial response. The automated support engine sends the automatic initial response to the client to assist a user in resolving the identified issue.

15 Claims, 7 Drawing Sheets

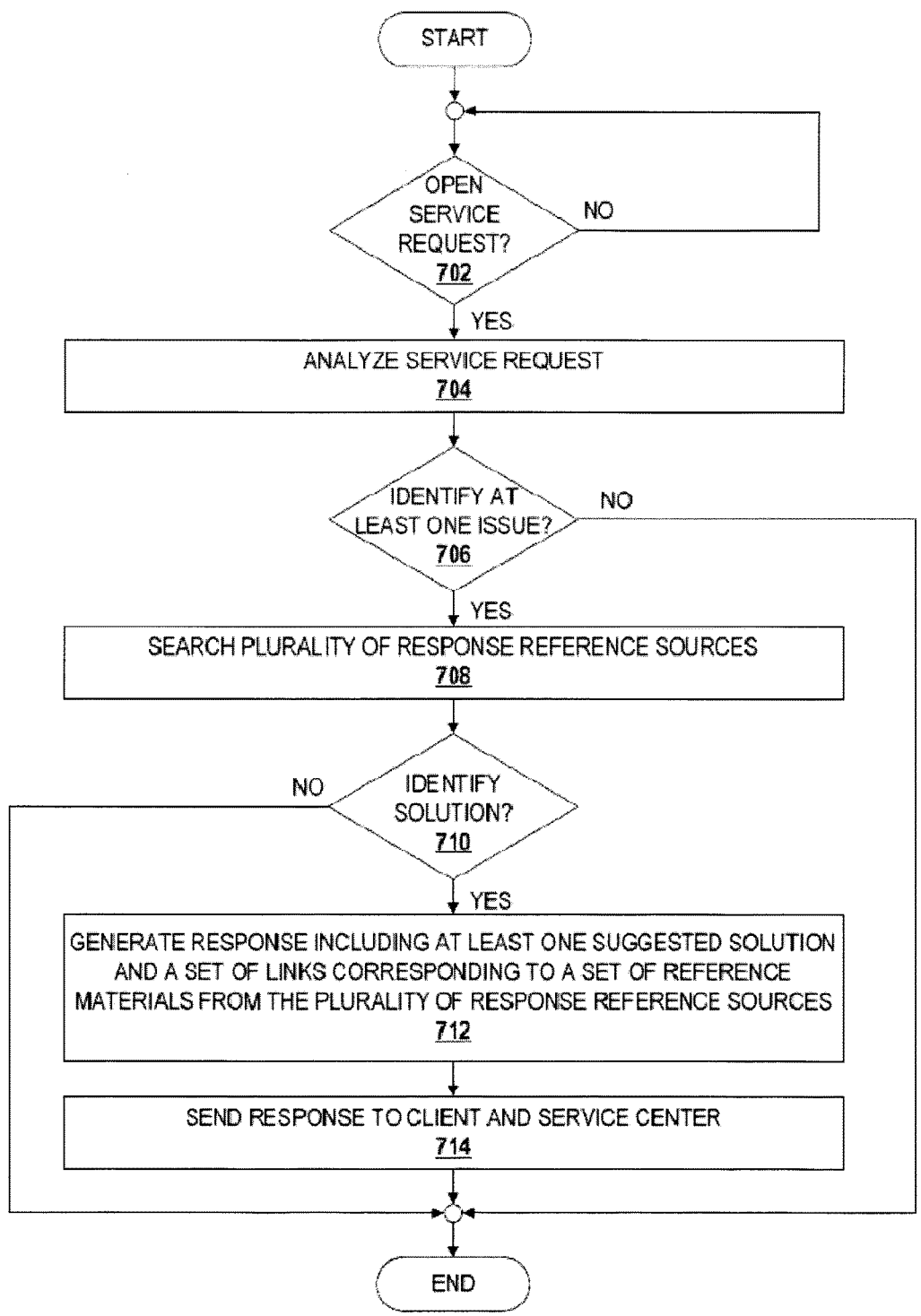

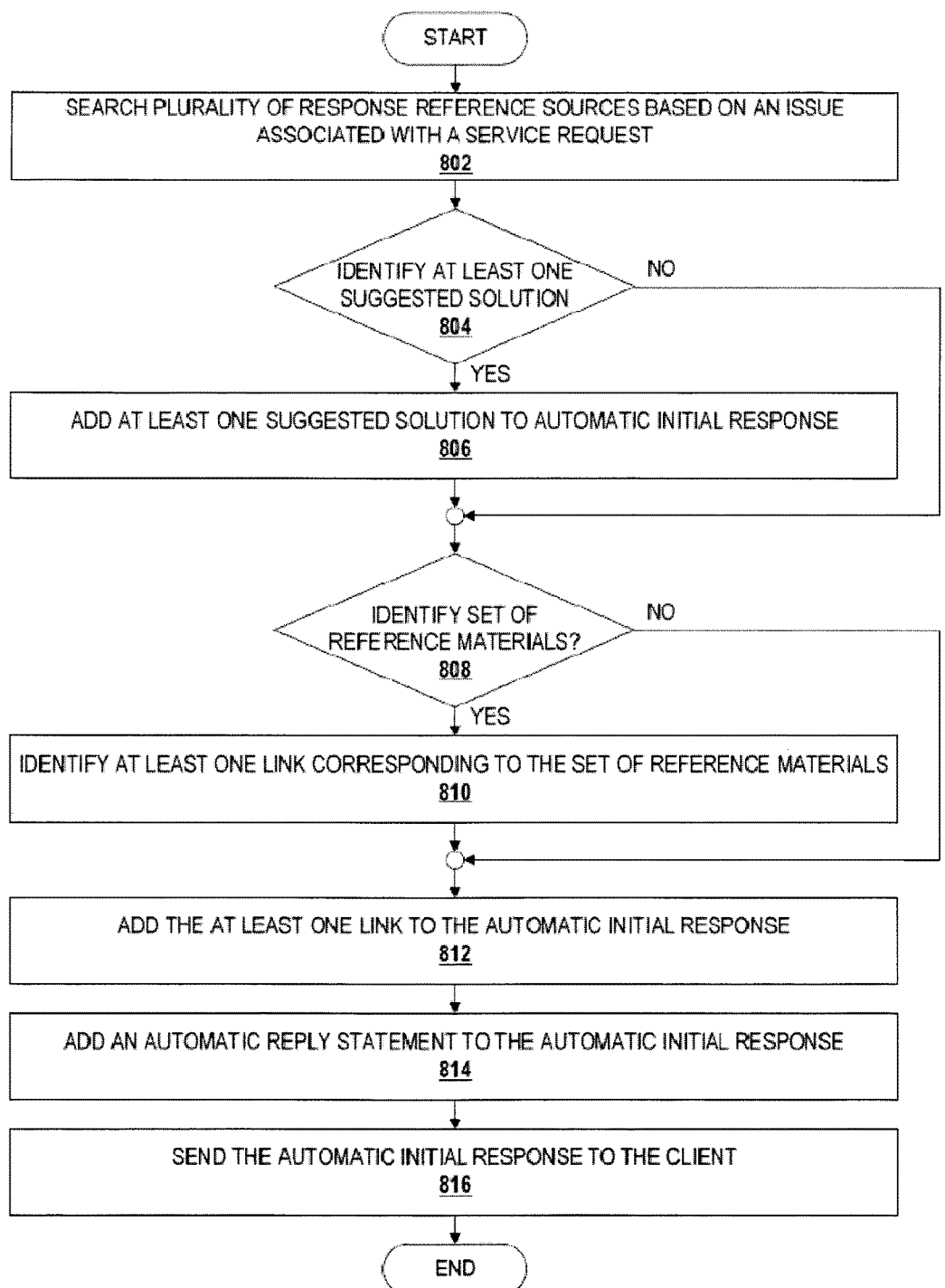

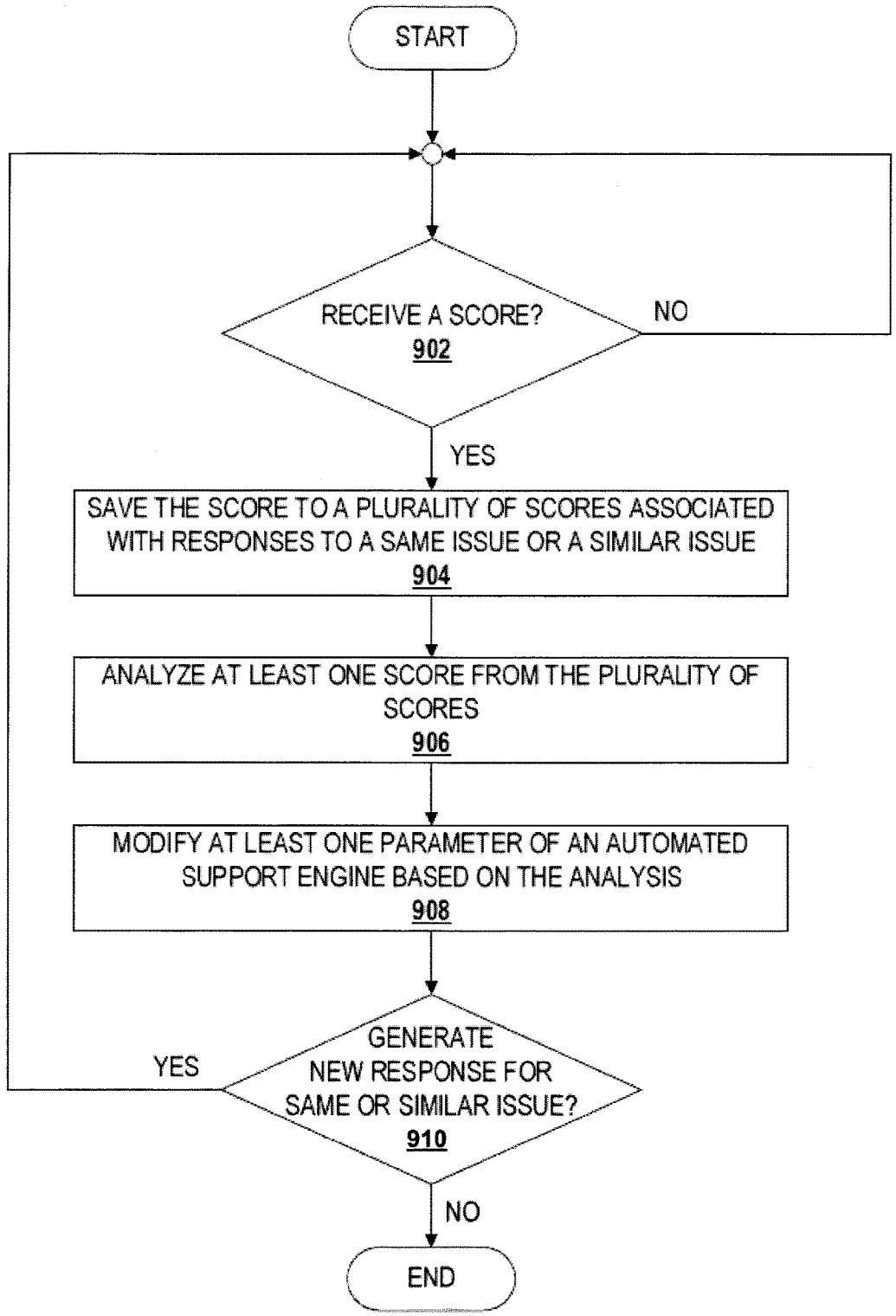

PROVIDING AUTOMATIC SELF-SUPPORT RESPONSES

BACKGROUND

A service request is a request from a user for assistance with some aspect of a computing system. A service request may be related to software support as well as hardware support. For example, users may request assistance with installing software or hardware, utilizing a particular feature of an application, system performance problems, disaster recovery, questions associated with configuration or design of a system, as well as other issues. In the area of user support and help desk services, large numbers of repeated identical service requests and similar service requests are received from different users. A repeated service request is a service request associated with the same issue faced by different users. These repeated service requests mean that the same job or task is being done again and again by different support personnel responding to these service requests.

Moreover, these repeated requests increase the volume of service requests received by the support personnel. This greater volume of service requests may lead to increased queue length for requests. This duplication of effort by service personnel responding to repeated service requests is costly, inefficient, and time consuming for both users making the service requests as well as for the service center responding to the requests.

SUMMARY

Examples of the disclosure provide for providing automatic initial responses to service requests. In an example, a service request is analyzed to identify at least one issue associated with the service request. At least one suggested solution associated with resolving the at least one issue and a set of reference materials associated with the at least one issue are identified based on a search of a plurality of response reference sources. An automated support engine generates an automatic initial response to the service request. The automatic initial response includes at least one link corresponding to the set of reference materials and the at least one suggested solution for resolving the at least one issue. The automatic initial response is sent to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is an exemplary flowchart illustrating an automatic initial response to a service request.

FIG. 8 is an exemplary flowchart illustrating generation of an automatic initial response.

FIG. 9 is an exemplary flowchart illustrating training an automated support engine based on user generated scores.

Corresponding reference characters indicate corresponding parts throughout the drawings.

DETAILED DESCRIPTION

Figure 1:
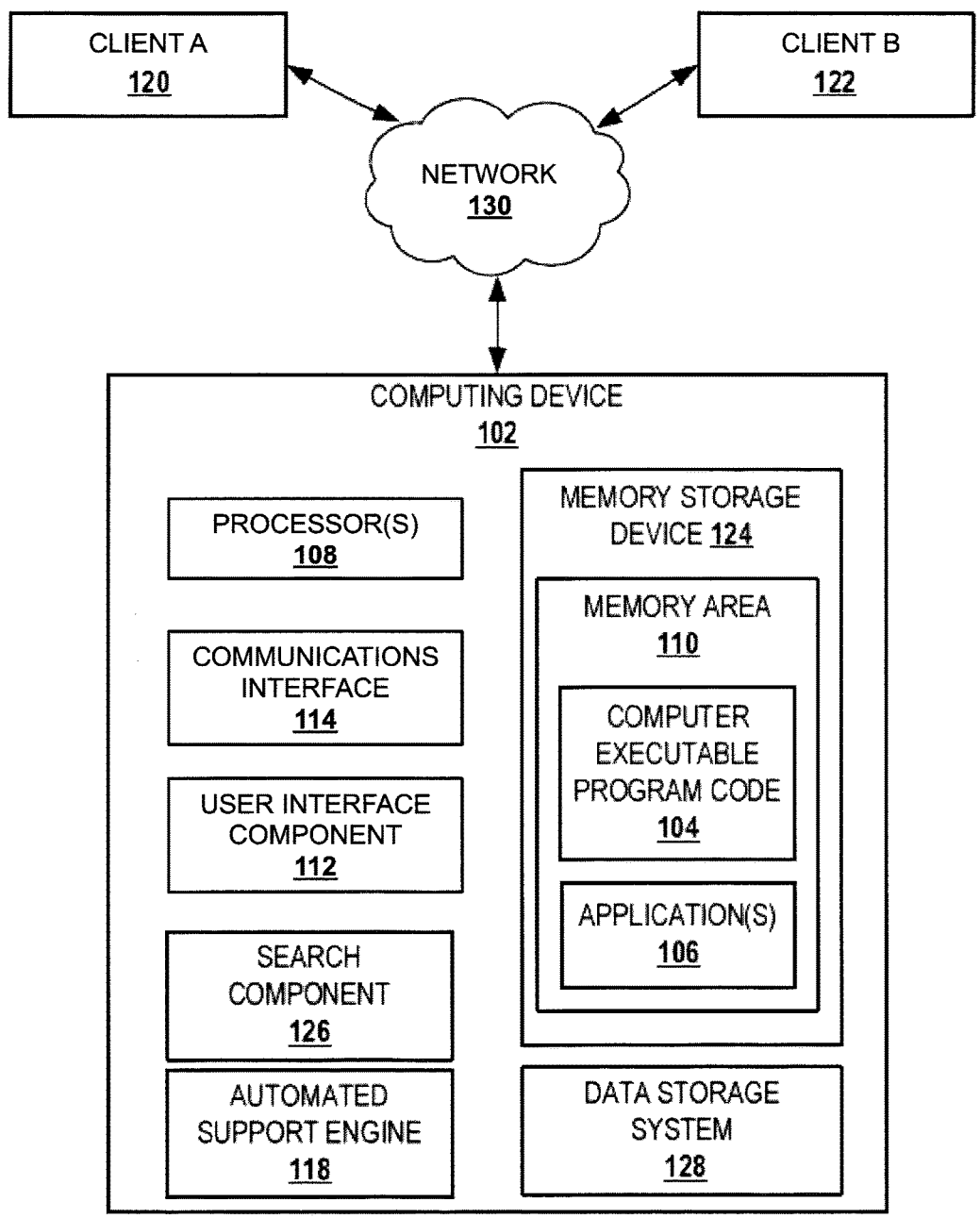
FIG. 1 is an exemplary block diagram illustrating a system for providing automatic initial responses to service requests.

In some examples, an automated support engine generates automatic initial responses to user service requests. The automatic initial responses provide complete solutions to some service requests, reducing the number of service requests requiring response by human technology service engineers (TSEs). In addition, the automatic initial responses provide suggestions and links to relevant reference materials to assist users and TSEs with resolving issue(s) associated with the service requests. In this manner, the automated support engine reduces service request response time and improves accuracy of information provided to users and TSEs. The automatic initial responses provides an instantaneous, automatic front-line support which further reduces the number of open service requests waiting in a queue for response by human TSEs. This further improves TSE efficiency while reducing costs associated with responding to service requests.

In other examples, an advanced search component is provided. The search component enables searching unstructured data sources for information relevant to resolving one or more issues associated with service requests. This search component further improves the accuracy and usefulness of information provided to users and TSEs responding to the service requests. This search component further reduces service request response time and reduces service request queue length.

Other examples provide a training engine that utilizes a plurality of user generated scores to train the automated support engine. The scores indicate a quality of each response, a particular suggested solution, or a recommended reference material provided in the response. The scores are analyzed to determine the accuracy, helpfulness, and/or relevance of a response, suggested solution, or recommended reference material in assisting a user with resolving one or more issue(s) identified in a service request. The training engine in some examples utilizes the analysis results to adjust or modify a set of one or more parameters of the training engine. In this manner, the training engine trains the automatic initial response engine to generate more accurate, helpful, and relevant responses to the same issue or similar issue(s).

The training engine also utilizes the analysis results to improve accuracy in selecting pre-generated responses, solutions, or sets of links in response to the same issue or similar issues. As used herein, the term "set" refers to one or more items, unless defined otherwise.

The training engine in some examples utilizes the user generated scores to improve the overall efficiency of the automatic initial response generation system and improve the user's experience when interacting with a service center. In other examples, the automated support engine and/or training engine are automatically updated and improved with minimal intervention.

In other examples, the automated support engine sends the same automatic initial response to different users in response to different service requests associated with the same issue or a similar issue. In other words, when the response generation engine identifies the exact same issue or a similar issue associated with a set of two or more service requests from different users, the response generation engine sends the same automatic initial response to the users in response to each service request in the set of service requests. In these examples, the response generation engine does not generate a new response to each service request. Instead, the response generation engine quickly identifies a pre-generated or previous response which is responsive to the issue(s) identified, and sends that pre-generated or previous response to the user without creating a new response. This feature enables increased speed in responding to service requests and reduces processor load by avoiding generation of a new response. In some examples, a pre-generated automatic initial response is returned to the client associated with the service request without performing a search of the plurality of response data sources and without generating a new automatic initial response specifically tailored for each service request.

The automated support engine provides automation of product support to increase efficiency of service and improve supportability of systems to save time and resources. The provision of automatic initial responses to service requests improves user experience dealing with the support center and TSE personnel. The information provided to both users and TSEs improves accuracy of information and services provided to users while minimizing time to response issues.

Some benefits of the automatic initial responses are measured as a number of service requests automatically closed without additional support from TSEs. The benefits are also measurable based on the user-generated scores enabling improved overall user satisfaction with support services.

Referring to FIG. 1, an exemplary block diagram illustrates a system 100 for providing automatic initial responses to service requests. In the example of FIG. 1, the data processing system represents a system for automatically responding to user service requests. A service request includes any type of request from a user for assistance, advice, information, or other support associated with a computing device or computing system. Some non-limiting examples of service requests include requests for assistance with establishing a network connection, diagnosing performance issues, improving system response time, setting up a user account, obtaining configuration information, assistance re-booting a computer, assistance installing new hardware or new software components, or any other type of support assistance.

The computing device 102 is any type of device or system for processing requests and automatically responding to service requests. In this example, the computing device 102 is a device executing computer executable program code 104 (e.g., as application(s) 106, operating system functionality, or both) to implement the operations and functionality associated with the computing device 102.

The computing device 102 may be a a web server, an application server, a file server, a back-end server, a cloud server, or any other type of server. In other examples, the computing device 102 is a data storage system. In other examples, the computing device 102 is a group of processing units or other computing devices.

In some examples, the computing device 102 includes one or more processor(s) 108, a memory area 110 associated with a memory storage device 124, and at least one user interface component 112.

The processor(s) 108 includes any quantity of processing units, and is programmed to execute computer-executable program code 104 for implementing aspects of the disclosure. The computer-executable program code 104 may be performed by the processor(s) 108 within the computing device 102, or performed by a processor external to the computing device 102. In some examples, the processor(s) 108 is programmed to execute exemplary flowchart(s) such as those illustrated in the figures (e.g., FIGS. 7 and 8)

In some examples, the processor(s) 108 represents an implementation of analog techniques to perform the operations described herein. For example, the operations may be performed by an analog computing device and/or a digital computing device.

The computing device 102 further has one or more computer readable media such as the memory area 110. The memory area 110 includes any quantity of media associated with or accessible by the computing device 102. The memory area 110 may be internal to the computing device 102 (as shown in FIG. 1), external to the computing device (not shown), or both (not shown). In some examples, the memory area 110 includes read-only memory (ROM) and/or memory wired into an analog computing device.

The memory area 110 stores, among other data, the computer executable program code 104 and the one or more application(s) 106. The application(s) 106, when executed by the processor(s) 108, operate to perform functionality on the computing device 102. Exemplary application(s) 106 include, without limitation, mail server application programs, web services, address book services, messaging services, media services, location-based services, search programs, and the like. The applications may communicate with counterpart applications or services such as web services accessible via the network 130. For example, the applications may represent server-side applications executing in a cloud that correspond to downloaded client-side services.

The memory area 110 further stores one or more computer-executable components. Exemplary components include a communications interface 114, an application programming interface (API), and an automated support engine 118.

The automated support engine 118 is an analysis engine for analyzing service requests, searching response resources for relevant materials based on a problem description 209, and automatically generating a response to the service request that provides one or more possible solution(s) to the problem and/or other information associated with the problem described in the service request.

In some examples, the computing device 102 further includes a search component 126. The search component 126 includes a search engine for locating possible solutions to a problem described in a service request and/or locating one or more reference materials associated with the problem described in the service request. The search component 126, when executed, causes the processor(s) 108 to search structured and unstructured response resources for solution(s).

An exemplary solution includes information related to the problem and/or solution to the problem identified in the service request. In other words, a solution includes information that provides a solution to the problem as well as information that does not provide a solution but is related to the problem. Information related to a problem includes information that explains possible causes of the problem, provides insight into the problem, diagnoses the problem, provides a temporary solution to the problem, provides a permanent solution to the problem, provides one or more suggestions for minimizing the problem or otherwise mitigating issues associated with the problem, describes tests to diagnose the cause of the problem, and/or provides suggestions or other information that is relevant to the problem described in the service request.

The computing device 102 in some examples includes a communications interface 114. The communications interface 114 optionally includes a network interface card and/or computer-executable program code (e.g., a driver) for operating the network interface card. Communication between the computing device 102 and other devices, such as client A 120 and client B 122, may occur using any protocol or mechanism over any wired or wireless connection. In some examples, the communications interface 114 is operable with short range communication technologies, such as by using near-field communication (NFC) tags.

In some examples, the communications interface 114 includes an API for sending and receiving data. For example, the computing device 102 receives requests and other data from client(s) and sends responses and other data to the client(s) via the API. In other examples, the API is a representational state transfer (REST) API.

The computing device 102 in some examples includes the user interface component. The user interface component 112 includes a graphics card for displaying data to the user and receiving data from the user. The user interface component 112 may also include computer-executable program code (e.g., a driver) for operating the graphics card. Further, the user interface component 112 may include a display (e.g., a touch screen display or natural user interface) and/or computer-executable program code (e.g., a driver) for operating the display. The user interface component may also include one or more of the following to provide data to the user or receive data from the user: speakers, a sound card, a camera, a microphone, a vibration motor, one or more accelerometers, a BLUETOOTH™ communication module, global positioning system (GPS) hardware, and a photoreceptive light sensor. For example, the user may input commands or manipulate data by moving the computing device in a particular way.

The computing device 102 optionally includes a data storage system 128. The data storage system 128 includes one or more data storage devices. A data storage device may include one or more rotating magnetic storage devices, one or more rotating optical storage devices, and/or one or more solid state drives (SSDs), such as a flash drive. A data storage device may also include a storage array. A data storage array may be, for example, a redundant array of inexpensive disks (RAID) array, an optical storage array, or any other type of data storage array.

The data storage system 128 may also include one or more storage processor(s), one or more port(s), one or more cache(s), memory, network interface card (NIC), one or more pools, one or more fans, and/or one or more data storage devices. A port is a network port, such as, but without limitation, an Ethernet Port or a Fibre Channel (FC) port.

The data storage system 128 may be located within the computing device 102 or closely associated with the computing device 102, as shown in FIG. 1. However, in other examples, the data storage system is located externally to the computing device 102 or remotely to the computing device 102.

The data storage system 128 in this example includes a database storing a plurality of response resources. A response resource includes both structured data and unstructured data. A response resource includes electronic documents, videos, sound files, knowledge base (KB) articles, previous service request responses, manuals, reference materials, and any other structured or unstructured data source capable of being stored in a data repository, such as, a database or other data storage device associated with the computing device 102.

The search component 126 searches the database of response resources to identify solution(s) and other information related to an identified problem. The search component 126 also searches the database to locate one or more reference materials related to the identified issue.

In this example, the computing device 102 is connected via a network 130 to client A 120 and client B 122. The network 130 may include any type of network connection. In one example, the network 130 may be the Internet, an intranet, an Ethernet, or other wireless or hardwired connections by which the computing device 102 may send and receive data associated with one or more other computer systems, such as, but without limitation, client A 120 and/or client B 122.

In this non-limiting example, system 100 includes a server-client network. However, aspects of the disclosure are not limited to networked systems. In other examples, the system 100 does not include a network 130.

Client A 120 and client B 122 represents any computing device executing instructions (e.g., as application programs, operating system functionality, or both) to implement the operations and functionality associated with the computing device. For example, client A 120 may include a mobile computing device or any other portable device. In some examples, the mobile computing device includes a mobile telephone, laptop, tablet, computing pad, netbook, gaming device, and/or portable media player. Client A 120 may also include less portable devices such as desktop personal computers, kiosks, tabletop devices, industrial control devices, wireless charging stations, and electric automobile charging stations. Additionally, client A 120 may represent a group of processing units or other computing devices.

In some examples, client A 120 includes one or more processor(s), a memory area, and at least one user interface. The processor includes any quantity of processing units, and is programmed to execute computer-executable program code for implementing aspects of the disclosure. The instructions may be performed by the processor or by multiple processors within client A 120, or performed by a processor external to client A 120.

Client A 120 stores applications in a memory area. The applications, when executed by the processor, operate to perform functionality on client A 120. Exemplary applications include mail application programs, web browsers, calendar application programs, address book application programs, messaging programs, media applications, location-based services, search programs, and the like. The applications may communicate with counterpart applications or services associated with computing device 102, such as web services accessible via the network 130. For example, the applications may represent downloaded client-side applications that correspond to server-side services executing in a cloud.

In this non-limiting example, client A 120 includes communications component(s) for sending service requests to the computing device 102 and receiving automatic initial service responses generated by the automated support engine 118 from the computing device 102. In some examples, the service requests are sent to the computing device 102 via an API. In these examples, client A 120 receives the automatic initial service responses from the server via the API. In other examples, the API is a REST API.

In the example shown in FIG. 1, the system 100 includes a computing device 102, a network 130, client A 120, and client B 122. The system 100 may be implemented as a networked data processing system. In these examples, the computing device 102 sends and receives data from client A 120 and/or client B 122 via a network connection, such as an Internet connection, Ethernet connection, or any other type of network connection.

In some non-limiting examples, the computing device 102 connects to the network using an application, such as a web browser, cloud application, or other application for connecting to the network. The web browser may include any type of application for sending, receiving, retrieving, and/or traversing data over the World Wide Web (WWW) and/or the Internet.

However, in other examples, the system 100 may not include a network. In these examples, client A 120 and computing device 102 may be implemented within a same computing device without a network connection.

In still other examples, the system 100 includes a networked server and multiple clients and/or multiple data storage systems. In another example, computing device 102 may be connected via a network to two or more client computing devices.

In this example, the automatic initial response is sent to the user before the user is contacted by human TSE personnel for assistance. However, in other examples, the automatic initial response is sent to a user and TSE during the user's communication or service call with the TSE personnel and/or after communication with the TSE personnel.

For example, during conversation with TSE personnel, the user and/or TSE personnel may clarify an existing issue that was not addressed in a first automatic initial response or discover one or more new issues not described in the service request. In such cases, either the user or the TSE personnel may initiate a new service request to obtain a second automatic initial response providing solution(s) and/or links to recommended reference materials associated with resolving the new issues. Resolving an issue refers to permanently solving a problem, temporarily solving the problem, obtaining additional information describing the problem and/or possible solutions to the problem, diagnosing a cause of the problem, or otherwise providing information to assist a user in eliminating, mitigating, explaining, or diagnosing the problem. The second automatic initial response in these examples is sent to both the TSE and the user, enabling the TSE to obtain up-to-date information on resolving the new issues during the service call.

Figure 2:
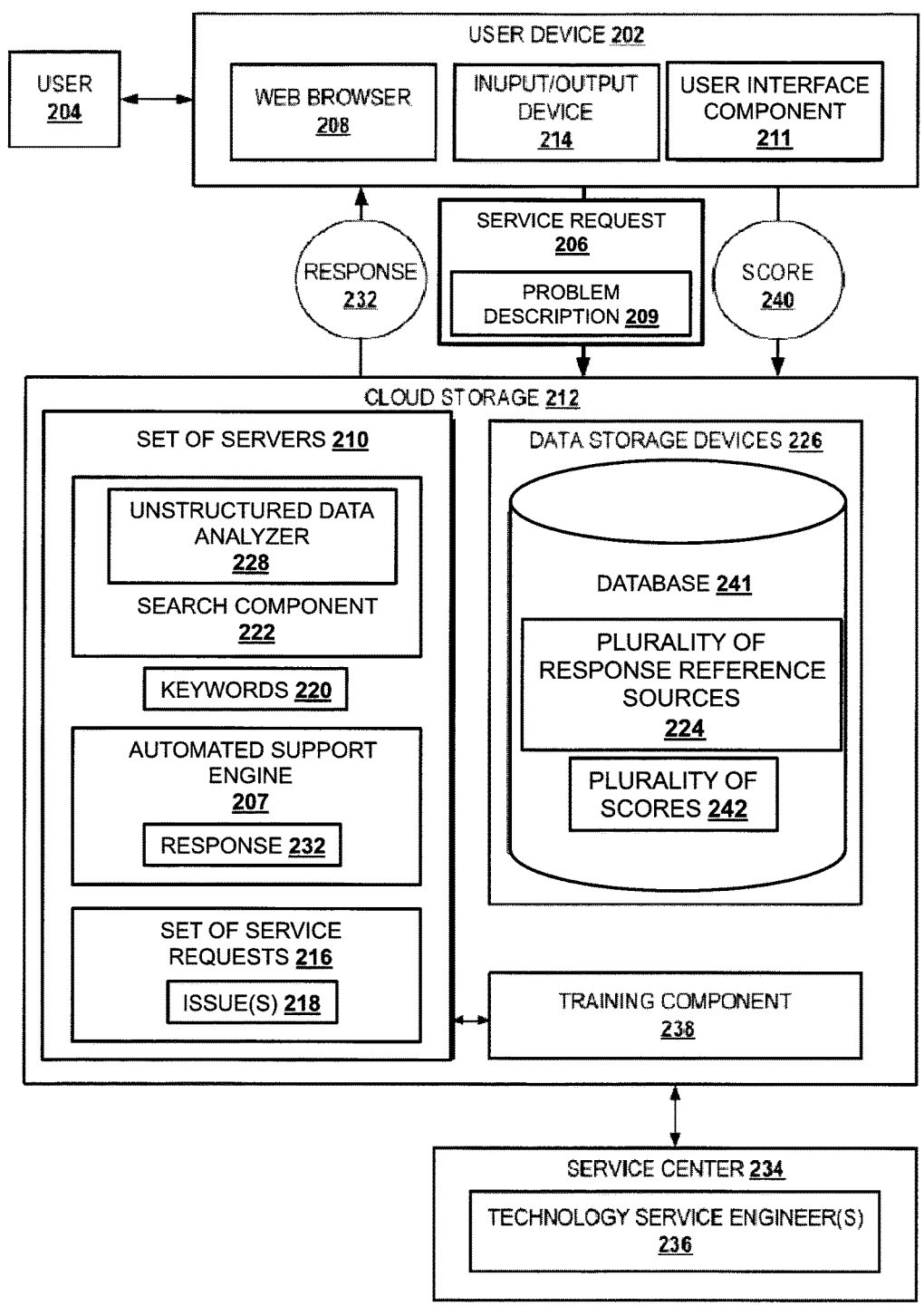
FIG. 2 is an exemplary block diagram illustrating a user device associated with a cloud storage system.

Referring now to FIG. 2, an exemplary block diagram illustrates a user device associated with a cloud storage system. In this example, a user device 202 associated with a user 204 sends a service request 206 to an automated support engine 207 running on one or more servers in a set of servers 210.

The user device 202 may be implemented as any type of device capable of sending a service request 206 to one or more cloud servers associated with cloud storage 212. For example, the user device 202 may be a desktop computer, a laptop computer, a tablet computer, a smart phone, or any other type of user device.

The service request 206 includes the problem description 209. In some examples, the problem description 209 is in a text format. In other examples, the problem description 209 is in an audio format, a video format, a combination of an audio format and video format, or any other format for sending a service request.

In this example, the user device 202 sends the service request 206 via a web browser 208. In other examples, the user device 202 sends the service request via a communications interface. In other examples, the user device 202 initiates service requests associated with cloud storage 212 and otherwise accesses resources and services via one or more application(s), such as, but not limited to, a cloud storage gateway, a web-based content management system, or a web browser 208.

In some examples, the user 204 generates the service request 206 via a user interface component 211. The user interface component 211 in some examples includes a graphical user interface (GUI). For example, the user may generate, create, select and/or send the service request 206 by selecting one or more icons on the GUI. However, the embodiments are not limited to creating, generating, selecting, or sending a service request via a user interface component or a GUI.

The user device 202 optionally includes an input/output device 214. The user 204 may utilize the input/output device 214 for creating the service request 206, viewing a response to the service request, and/or generating a score ranking a quality of the response. The input/output device 214 may include, without limitation, a keyboard, mouse, touch screen, monitor, projection screen, speakers, microphone, camera, or any other type of input or output device.

The service request 206 is placed in a queue. The queue includes a set of service requests 216 waiting to be processed by the automated support engine 207. The set of service requests 216 is a set of one or more service requests. Each service request in the set of service requests 216 is associated with one or more issue(s) 218. A single service request identifies a single issue. In other examples, a single service request identifies two or more issues.

In some examples, a first service request in the set of service requests 216 identifies an issue that is the same or similar to an issue identified in a different service request in the set of service requests 216. In other examples, a service request from a user identifies a unique issue that is different from issues associated with other different service requests in the set of service requests in the queue.

The automated support engine 207 associated with cloud storage 212 retrieves the service request 206 from the queue and analyzes the problem description 209 to identify at least one issue. In other words, the automated support engine 207 identifies one or more issues based on the problem description 209 included within the service request 206.

In some examples, the automated support engine 207 includes a text analyzer that parses the problem description 209 to identify the one or more issues. In other examples, the automated support engine 207 analyzes the problem description 209 to identify a set of one or more keywords 220 associated with the one or more issues.

A search component 222 searches a plurality of response data sources 224 stored on one or more data storage devices 226. The data storage device(s) 226 may include a data storage array. The data storage device(s) 226 may also include one or more types of data storage devices, such as, for example, one or more rotating disks disk drives and/or one or more SSDs.

The one or more data storage devices 226 optionally include one or more databases 241 for storing data, such as the plurality of response reference sources 224. In this example, the plurality of response reference sources 224 is stored in a single database. In other examples, the plurality of response reference sources 224 is stored in a set of two or more database.

The search component 222 is a search engine for searching the plurality of response reference sources to identify one or more suggested solution(s) to the issue and/or one or more reference materials from the plurality of response reference sources associated with resolving the one or more issues identified in the service request 206. A suggested solution provides a possible permanent solution to a problem, provides a temporary solution, provides one or more suggestions for mitigating or lessening the negative effects of the problem, provides helpful hints or other information for avoiding or preventing the problem from reoccurring in the future, or otherwise provides one or more suggestions for handling the issue.

In some examples, the search component 222 includes an unstructured data analyzer 228. The unstructured data analyzer 228 enables the search component 222 to search a set of unstructured data materials for solution(s) and/or reference materials associated with resolving an issue associated with the service request 206. The unstructured data analysis analyzer 228 searches natural language data sources, such as text documents, articles, user comments, previously generated responses to closed service requests, and other unstructured data sources.

In response to identifying at least one possible solution for the issue and/or a set of reference materials from the plurality of response reference sources 224, the automated support engine 207 generates a response 223 to the service request 206.

Generating a response to the service request 206 in some examples includes creating a new response. In other examples, generating a response to the service request includes identifying a pre-generated response stored in a database or identifying a previous response stored in response history data which is responsive to the issue(s) associated with the service request. In other words, the automated support engine identifies a pre-generated automatic initial response associated with a closed service request that provides at least one solution to an issue that is the same as the issue in the open service request or similar to the issue in the open service request.

An open service request is a pending service request waiting in the queue, pending, unresolved, and/or a service request in which an automatic initial response has not yet been sent. In other words, if an automatic initial response has not been sent in response to a service request, the service request is still open. A service request may remain open after the automatic initial response has been sent if the automatic initial response does not resolve all the issues associated with the service request. In such cases, a TSE responds to the service request. A closed service request is a service request that has been resolved and/or is no longer pending.

In these examples, the pre-generated automatic initial response corresponding to the same or similar issue as the issue(s) identified in the open service request is then sent to the user as an automatic initial response. A pre-generated automatic initial response includes automatic initial responses sent in response to service calls associated with different users and/or different clients. In other words, a pre-generated automatic initial response is a response to a different, closed service call that is also responsive to the currently opened service call. In these examples, a new response is not generated for each service request. Instead, the same automatic initial response is sent to a plurality of users in response to a plurality of service requests associated with the same issue or a similar issue. Thus, similar and repeated service requests are responded to in a quick and efficient manner.

In this example, the set of reference materials is a set of one or more reference materials associated with resolving at least one issue. The response 232 is an automatic initial response. The automatic initial response includes the at least one solution and at least one link corresponding to the set of reference materials.

A user clinks on a link corresponding to a reference material to access or retrieve the reference material. A link corresponding to a set of reference materials is a link that leads to or links to one or more reference materials.

The automated support engine 207 sends the response 232 to the user device 202 associated with the service request 206. The user device 202 in some examples displays the response to the user via the user input/output device 214. The response 232 in some examples is output to the user in a visual format, an audio format, or a combination of a visual and audio format, such as when playing video content to the user 204. In other words, the examples are not limited to displaying the automatic initial response to the user on a monitor or other display device. Displaying the automatic initial response to the user includes outputting the automatic initial response to the user via a graphical display, an audio output, a projected image, or any other type of output associated with the user device 202.

If the suggested solutions and links to the reference materials intended to assist the user with resolving the issue(s) associated with the service request are sufficient to resolve the issues(s), the user 204 closes the service request. However, if the user is unable to completely resolve the issue(s), the service request remains open. In such cases, human TSEs 236 contact the user to assist the user with resolving any remaining issue(s) associated with the service request 206.

In some examples, the automated support engine 207 sends the response 232 to a service center 234. A service center 234 includes one or more TSE personnel. TSE personnel include human personnel that respond to service requests via instant messaging or online chat room, a video conferencing, phone call, or other method for the TSE personnel to communicate with the user to assist the user with resolving the service request. In these examples, the TSEs 236 utilize the information provided in the automatic initial response to assist the TSEs with diagnosing and resolving the remaining unresolved issues associated with the service request 206.

In these example, at least one TSE 236 receives the response 232 sent to the user 204, determine if the service request is still open, and contact the user 204 to assist the user with resolving the issue(s) associated with the service request 206 if the automatic initial response did not resolve the issue(s).

In this example, the automated support engine 207 is running on one or more cloud servers associated with cloud storage 212 located remotely from the service center 234. In other examples, the automated support engine 207 is executed on one or more servers located within the service center 234. In other words, the automated support engine 207 is integrated within the service center in some examples.

In some examples, the automated support engine 207 and/or a training component 238 prompts the user 204 to provide a score 240 rating a quality of the response 232. The score 240 is a score on a scale ranking the response on a scale indicating whether the information provided in the automatic initial response was helpful, accurate, useful, or otherwise relevant to resolving the issue(s) associated with the service request.

In some non-limiting examples, the score may be a score on a number scale, a percentage, an indicator, or any other type of score. For example, a score on a number scale may include a score from one to five, where a high score indicates a relevant response providing information that resolved the issue or assisted the user or TSE in resolving the issue. In these examples, a score lower on the scale indicates a less relevant response that was not helpful in resolving the issue(s).

In other examples, the score may be on a letter scale where an "A" indicates a relevant response and a "B" indicates a less relevant response. In still other examples, the score may be an indicator such as a check symbol or a plus sign for a relevant response and an "x" symbol or a thumbs-down icon for a less relevant response.

The score 240 is saved in a plurality of scores 242 for the same issue or similar issue(s). The plurality of scores 242 in some examples is saved in data storage devices 226, such as a database, data structure, a memory, or other data storage.

The training component 238 analyzes at least one score in the plurality of scores 242 to modify or adjust one or more parameters associated with the automated support engine 207. The training component 238 modifies the parameters associated with the automated support engine 207 to improve the quality of the responses and increase the scores received from users. As new responses are generated and new scores are received from users, the training component 238 recursively adjusts the parameters to improve the accuracy, helpfulness, and relevance of the responses generated by the automated support engine 207.

Figure 3:
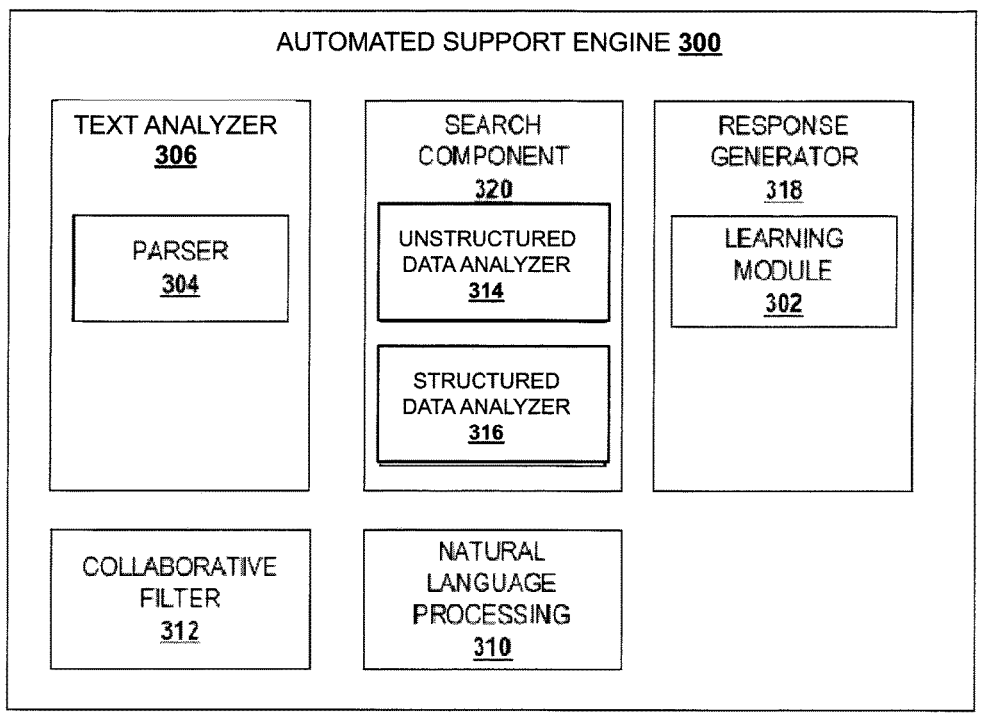
FIG. 3 is an exemplary block diagram illustrating an automatic support engine.

FIG. 3 is an exemplary block diagram illustrating an automated support engine 300. The automated support engine 300 in this example includes a text 306. The text analyzer 306 optionally includes a parser 304 for parsing a problem description extracted from a service request. The text analyzer 306 analyzes the problem description associated with the service request to identify one or more issue(s) to be resolved. In other examples, the text analyzer 306 parses the problem description to identify a set of one or more keywords. The set of keywords are used to search the plurality of response data sources for relevant reference materials and/or solution(s) to the identified issue(s).

The search component 320 is an advanced search component that analyzes, parses, and/or searches both structured and unstructured data sources for reference materials relevant to the issue(s) and/or possible solution(s) to the described problem. The unstructured data analyzer 314 analyzes and searches unstructured data sources, such as documents, articles, user posts, past responses to service requests, user manuals, and other unstructured data. The structured data analyzer 316 analyzes and searches structured data sources.

The search component 320 is not limited to searching tags associated with reference materials. The search component 320 analyzes text and other content of the reference materials to identify relevant materials. The search component also uses previous search results and past solutions to identify solutions and recommended reference materials.

The response generator 318 generates the automatic initial response to the service request. The response generator 318 optionally includes a learning module 302, hadoop, and other data algorithms for responding to service requests. The learning module 302 is a learning machine. The learning module, hadoop, and/or data algorithms assist the automated support engine in processing large unstructured data sets to identify solutions, as well as recognizing similar or overlapping service requests associated with the same or similar issue(s).

The natural language processing 310 is optionally included in the automatic support engine 300 to assist with text analysis of the problem description, searching the plurality of response, and/or generating a set of one or more suggested solution(s) in a natural language text format and/or audio format for output to the user.

The automated support engine 300 optionally includes a collaborative filter 312. The collaborative filter analyzes, detects, and/or recognizes patterns in data. The collaborative filter 312 assists text analyzer 306, search component 320, and/or response generator 318. The collaborative filter optionally assists in searching unstructured and structured data sources to identify relevant reference material(s) and/or solution(s) for resolving the issue(s), analyzing service request text to identify one or more issue(s), and generating the automatic initial response.

Figure 4:
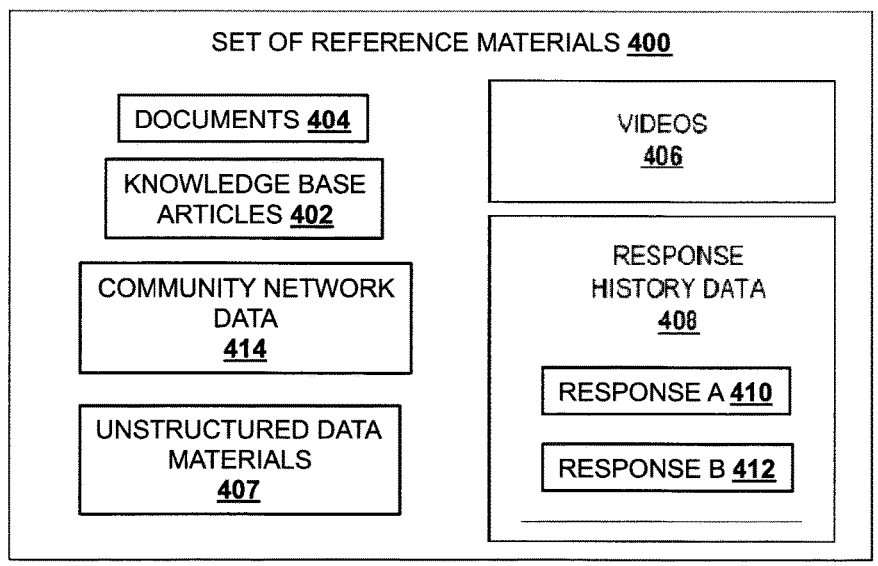
FIG. 4 is a block diagram of a set of response data sources.

FIG. 4 is a block diagram of a set of reference materials 400. The set of reference materials 400 is a set of one or more reference materials. In some examples, the set of reference materials 400 includes a plurality of reference materials. In other examples, the set of reference materials 400 includes only a single reference material.

In this example, the set of reference materials 400 optionally includes knowledge base (KB) articles 402, documents 404, videos 406, response history data 408, community network data 414, and/or unstructured data materials 407. KB articles 402 includes articles associated with a particular hardware component, a software component, a computing device, a data storage device, a service provider, and/or a particular issue associated with a computing system or a component of a computing system.

Documents 404 include any type of text format document. Documents 404 may include a user manual or product operation manual, schematics or technical drawings illustrating hardware components, algorithms, instructions, product descriptions, or any other type of documentation.

The videos 406 include one or more video format materials. Videos 406 are how to videos, instructional videos, product promotional videos, or any other video format material materials providing information which may be relevant, helpful, or informative to resolving a particular issue. The videos 406 may include visual or graphical materials and/or audio files. In other words, videos 406 may include a video or visual only material, an audio file without any video/visual materials, or a combination of audio and visual material.

Response history data 408 is a plurality of pre-generated automatic initial responses created by an automated support engine, as well as previous responses generated by one or more human TSEs. The response history data 408 includes one or more responses, such as response A 410 and response B 412. A response in response history data 408 is associated with at least one issue. In other words, the previous response includes information directed towards solving, resolving, or mitigating one or more issues. The responses in response history data provide one or more suggested solutions to one or more issues identified in a closed service request. If an issue identified in an open service request is the same or similar to an issue addressed by a pre-generated automatic initial response in the response history data, the automated support engine sends the pre-generated response to the client to assist the user in resolving the currently open service request instead of generating a new automatic initial response to the open service request.

Community network data 414 includes user generated data. The community network data 414 includes data generated by users and data generated by TSEs. Some examples of community network data 414 includes user questions or posts, other user responses to the questions or posts, TSE responses to user questions or posts, user reviews and other product or services feedback, user comments, etc.

Figure 5:
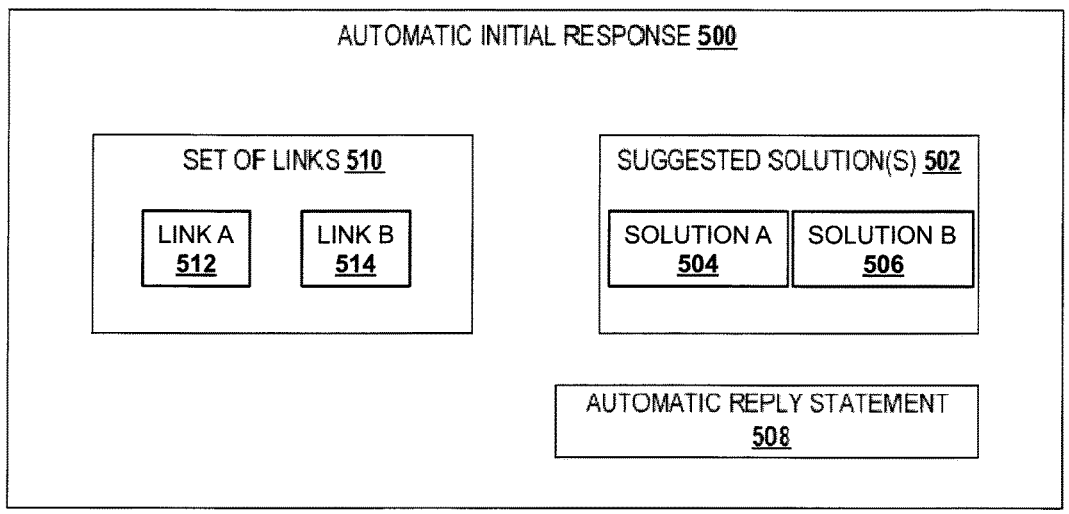
FIG. 5 is a block diagram of an automatic initial response.

FIG. 5 is a block diagram of an automatic initial response. In this example, an automatic initial response 500 includes one or more suggested solution(s) 502, a set of links 510 corresponding to a set of one or more reference materials, and optionally includes an automatic reply statement 508. In other examples, the automatic initial response 500 includes suggested solution(s) without any links to recommended reference materials. In other examples, the automatic initial response 500 includes a set of one or more links such as link A 512 and/or link B 514 to one or more reference materials but does not include any suggested solution(s).

The suggested solution(s) 502 includes at least one suggested solution to at least one issue identified from a problem description provided by a user in a service request. The suggested solution(s) 502 include hints, tips, suggestions, instructions, and other information associated with resolving an issue, mitigating a problem, preventing an issue from occurring in the future, diagnosing a cause of an issue, or performing a task. Performing a task includes tasks associated with a computing system or data storage system, such as maintenance tasks, installation tasks, updating tasks, service or repair tasks, allocation tasks, etc.

The suggested solution(s) 502 includes one or more recommended solutions, such as solution A 504 and solution B 506. However, the examples are not limited to including two solutions in the automatic initial response 500. In some examples, the automatic initial response includes a single solution. In other examples, the automatic initial response includes three or more recommended solutions.

In some examples, tasks include, without limitation, setting up a user account, installing hardware or software, removing hardware or uninstalling software, replacing hardware components, upgrading software to a newer version, setting up a network, accessing a network or other service, creating a web page, obtaining performance metrics or other performance information, allocating physical pools or logical pools, allocating logical units (LUNs), creating file systems or files, or any other task associated with a computing system or data storage system.

The automatic reply statement 508 is a statement that the automatic initial response is an automatic response. The statement 508 may also state that the user will be contacted by a TSE that will provide further assistance to the user with resolving the issue(s) described in the service request in due course. In other words, the automatic reply statement 508 is any text or audio statement stating that the automatic initial response 500 is an automatically generated reply that may be followed up by contact from TSE personnel.

In one example, the automatic initial response 500 is an email response automatically sent to one or more users in response to one or more service requests associated with the same issue or a similar issue. In other examples, the automatic initial response 500 is a text message, a recorded audio response message, a video message comprising a visual and/or audio format, an instant messaging response, or any other format for presenting suggested solutions and recommended reference materials to a user.

After the automatic initial response 500 is sent, a TSE contacts the user as normal to support the user. If the automatic initial response solves the issue(s), the service request is closed.

If the service request remains open after the user receives the automatic initial response, one or more TSE personnel contact the user to assist with resolving the issue(s). In these examples, the automatic initial response is also sent to the TSE responding to the service request. The automatic initial response provides helpful information, insight, and hints for solving the issue(s) to the TSE. In these cases, the automatic initial response may solve part of the problem or solve one issue and provide hints and suggestions to assist the TSE in resolving the remaining unresolved issue(s) associated with the service request.

Figure 6:
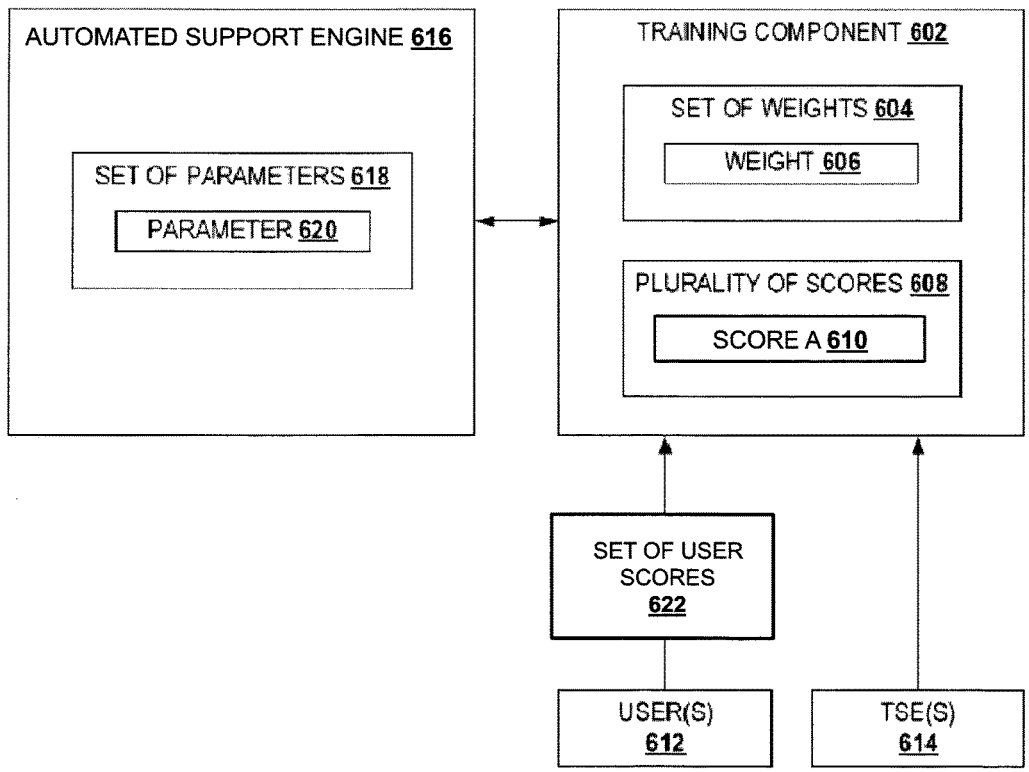
FIG. 6 is a block diagram of an automated support engine training component.

FIG. 6 is a block diagram of an automated support engine 616 and a training component 602. Training component 602 is a component for training an automated support engine 616. During an initial training, one or more TSEs 614 or other subject matter experts (SMEs) provide feedback to the training component 602 to train the automated support engine 616. In some examples, the SMEs or TSEs 614 review the responses generated by the automated support engine 616 and provide scores and/or other feedback indicating a quality of the responses.

In some examples, the TSEs 614 provide a set of weights 604. The set of weights include one or more weights 606. The weights are applied to keywords, identified issues, or other parameters to determine a relative importance of each parameter, keyword, and/or issue. The set of weights 604 are utilized by the learning module 302 to analyze the issues, identify relevant reference materials, identify possible solutions, and prioritize the identified solutions and/or reference materials.

In other words, some reference materials may be more helpful or informative to a particular issue than another. For example, if an issue is associated with installing a particular version of software, step-by-step instructions for installing that particular version of the software is likely to be more helpful to the user than user reviews of this software version. The step-by-step instructions are given greater weight in generating a solution and given greater priority or listed first in a set of links to reference materials provided to the user. Thus, the TSEs 614 in some examples modify and/or adjust the weights, scores, and parameters to improve the quality of the responses generated.

In other examples, one or more users 612 provide a set of scores 622 ranking a quality of a response. The set of scores 622 ranking the quality of a given response may include a single overall score for the response or two or more scores rating different components of the response. For example, the set of scores 622 may include a score rating the effectiveness of the suggested solution(s), another score rating the helpfulness or relevance of the set of links to the one or more recommended reference materials, and another score rating the overall user experience utilizing the automatic initial response.

In other examples, the set of user scores 622 includes a separate score for each suggested solution and another score for each reference material identified by the at least one links in the automatic initial response. The set of user scores 622 also includes one overall score for the response as a whole.

The quality of a response refers to the accuracy of information provided, helpfulness of the response in resolving the issue, relevance to the issue, and/or any other indicator of the quality of the response. Score A 610 received from a user is saved in a plurality of scores 608. Every score is associated with a previous response and/or at least one issue. Score A 610 may be associated with two or more issues.

The training component 602 analyzes at least one score in the plurality of scores associated with a particular issue and/or associated with a particular response. In some examples, the training component 602 analyzes all responses and scores associated with a same issue and similar issues. In other examples, the training component only analyzes responses and/or scores associated with the exact same issue.

The training component utilizes the analysis results to adjust or modify one or more parameters in the set of parameters 618. A parameter 620 in the set of parameters 618 includes one or more rules for generating an automatic initial response to a service request.

Referring now to FIG. 7, an exemplary flowchart illustrating automatic initial response to a service request is shown. The process shown in FIG. 7 may be implemented by a computing device, such as, but without limitation, the computing device 102 in FIG. 1, the set of servers 210 in FIG. 2, or the automatic support engine 300 in FIG. 3.

The process begins by determining if a service request is open at 702. If no, the process returns to 702. If a service request is open, the process analyzes the service request at 704. The process determines if at least one issue is identified at 706. If no issue is identified, the process terminates thereafter.

If at least one issue is identified at 706, the process searches a plurality of response reference sources at 708. The process determines if at least one solution is identified at 710. If no, the process terminates thereafter.

If at least one solution is identified at 710, the process generates a response including at least one suggested solution and a set of links corresponding to a set of reference materials from the plurality of response reference sources at 712. The process sends the response to a client and a service center at 714. The process terminates thereafter.

While the operations illustrated in FIG. 7 are described as being performed by a computing device, such as, the computing device 102 in FIG. 1, the set of servers 210 in FIG. 2, or the automatic support engine 300 in FIG. 3, aspects of the disclosure contemplate performance of the operations by other means. For example, a cloud service may perform one or more of the operations.

Referring now to FIG. 8, an exemplary flowchart illustrating generation of an automatic initial response is shown. The process shown in FIG. 8 may be implemented by a computing device, such as, but without limitation, the computing device 102 in FIG. 1, the set of servers 210 in FIG. 2, or the automatic support engine 300 in FIG. 3.

The process searches a plurality of response reference sources based on an issue associated with a service request at 802. The process determines if at least one suggested solution is identified at 804. If yes, the process adds the at least one suggested solution to an automatic initial response at 806. The process determines if a set of reference materials are identified at 808. If yes, the process identifies at least one link corresponding to the set of reference materials at 810. The process adds the at least one link to the automatic initial response at 812. The process adds an automatic reply statement to the automatic initial response at 814. The process sends the automatic initial response to the client at 816. The process terminates thereafter.

While the operations illustrated in FIG. 8 are described as being performed by a computing device, such as, the computing device 102 in FIG. 1, the set of servers 210 in FIG. 2, or the automatic support engine 300 in FIG. 3, aspects of the disclosure contemplate performance of the operations by other means. For example, a cloud service may perform one or more of the operations.

Referring now to FIG. 9, an exemplary flowchart illustrating training an automated support engine based on user generated scores is shown. The process shown in FIG. 9 may be implemented by a computing device, such as, but without limitation, the computing device 102 in FIG. 1, the set of servers 210 in FIG. 2, or the automatic support engine 300 in FIG. 3.

The process begins by determining if a score is received at 902. If no, the process returns to 902. If a score is received, the process saves the score to a plurality of scores associated with responses to a same issue or similar issue at 904. The process analyzes at least one score from the plurality of scores at 906. The process modifies at least one parameter of an automated support engine based on the analysis at 908. The process determines if a new response for a same or similar issue is generated at 910. If yes, the process returns to 902. The process iteratively executes operations 902 through 910 until no new responses are generated at 910. The process terminates thereafter.

While the operations illustrated in FIG. 9 are described as being performed by a computing device, such as, the computing device 102 in FIG. 1, the set of servers 210 in FIG. 2, or the automatic support engine 300 in FIG. 3, aspects of the disclosure contemplate performance of the operations by other means. For example, a cloud service may perform one or more of the operations.

In some examples, the operations illustrated in FIG. 7, FIG. 8, and FIG. 9 may be implemented as software instructions, such as computer executable program code, encoded on a computer readable medium, in hardware programmed or designed to perform the operations, or both. For example, aspects of the disclosure may be implemented as a system on a chip or other circuitry including a plurality of interconnected, electrically conductive elements.

While aspects of the disclosure have been described in terms of various examples with their associated operations, a person skilled in the art would appreciate that a combination of operations from any number of different examples is also within scope of the disclosure.

Additional Examples

At least a portion of the functionality of the various elements in FIG. 1, FIG. 2, and FIG. 3 may be performed by other elements in FIG. 1, FIG. 2, and/or FIG. 3, or a means (e.g., processor, web service, server, application program, computing device, etc.) not shown in FIG. 1, FIG. 2, and FIG. 3.

In some examples, the operations illustrated in FIG. 7, FIG. 8, and FIG. 9 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for automatically responding to service requests. For example, the elements illustrated in FIG. 1, FIG. 2, and FIG. 3, such as when encoded to perform the operations illustrated in FIG. 7, FIG. 8, and FIG. 9, constitute exemplary means for analyzing service requests to identify an issue, exemplary means for searching response reference sources to identify a set of suggested solutions and/or a set of reference materials associated with the issue, exemplary means for generating an automatic initial response to the service request including the at least one suggested solution and/or a set of links to the set of reference materials, and exemplary means for sending the automatic initial response to the client associated with the service request.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
   receiving a service request from a user associated with the service request;
   analyzing the service request, by the one or more processors, to identify at least one issue associated with the service request;
   identifying (i) at least one suggested solution associated with resolving the at least one issue, and (ii) a set of reference materials associated with the at least one issue based on a search of a plurality of response reference sources;
   generating an automatic initial response to the service request, by an automated support engine, the automatic initial response comprising the at least one suggested solution for resolving the at least one issue and at least one link corresponding to the set of reference materials;
   sending the automatic initial response to the user associated with the service request;
   receiving a score from the user associated with the service request, the received score rating a quality of the automatic initial response, the received score being associated with the at least one issue;
   saving the received score to a database, the database comprising a plurality of other scores received from other users rating qualities of a plurality of other automatic initial responses;

analyzing at least some scores among the plurality of other scores in the database, each of the at least some scores being associated with a same issue as the at least one issue associated with the received score; and modifying, by a training engine, a set of parameters associated with the automated support engine based on the analysis of the at least some scores to avoid generating new responses to the same issue, thereby increasing a speed in responding to service requests and reducing processor load.

2. The computer-implemented method of claim 1, wherein the service request comprises a problem description and further comprising:

parsing the problem description associated with the service request, by a text analyzer, to identify at least one keyword associated with the at least one issue; and searching the plurality of response reference sources using the at least one keyword to identify the at least one suggested solution and the set of reference materials.

3. The computer-implemented method of claim 1, further comprising:

sending the automatic initial response to at least one technology service engineer associated with a service center.

4. The computer implemented method of claim 1, wherein searching the plurality of response reference sources further comprises:

searching a content of a text document to identify at least one reference material associated with the at least one issue.

5. The computer-implemented method of claim 1, wherein the plurality of response reference sources comprises a set of unstructured data materials, and further comprising:

searching the set of unstructured data materials by an unstructured data analyzer;

identifying a subset of the set of unstructured data materials associated with the at least one issue; and adding at least one link corresponding to the subset of the set of unstructured data materials to the automatic initial response.

6. The computer-implemented method of claim 1, wherein generating the automatic initial response further comprises:

retrieving an automatic reply statement; and adding the automatic reply statement to the automatic initial response.

7. A computing device comprising:

one or more processors;

a memory coupled to the one or more processors, the memory comprising a plurality of response reference materials;

a communications interface receiving a service request from a client, the service request comprising an issue to be resolved;

an automated support engine, the one or more processors executing the automated support engine to parse a problem description associated with the service request to identify the issue, search response history data to identify a pre-generated automatic initial response corresponding to the issue, and return the pre-generated automatic initial response to the client, the pre-generated automatic initial response comprising at least one suggested solution for resolving the issue associated with the service request and at least one link corresponding to a set of reference materials associated with the issue to be resolved, the set of reference materials comprising at least one unstructured data material associated with assisting a user in resolving the issue;

a scoring database comprising a plurality of user-generated scores, wherein a score comprises a rating of a quality of the pre-generated automatic initial response to a service request, a suggested solution to the issue, or a recommended reference material associated with the issue; and a training engine, the training engine analyzing at least some scores among the plurality of user-generated scores, each of the at least some scores being associated with a same issue as the issue to be resolved, and modifying a set of parameters associated with the automated support engine based on the analysis of the at least some scores among the plurality of user-generated scores to avoid generating new responses to the same issue, thereby increasing a speed in responding to service requests and reducing processor load.

8. The computing device of claim 7, further comprising:

an unstructured data analyzer, wherein the unstructured data analyzer analyzes a set of unstructured data materials to identify the at least one unstructured data material in the set of unstructured data materials associated with the issue.

9. The computing device of claim 7, further comprising:

a text analyzer, wherein the text analyzer parses the problem description for a set of keywords; and an advanced search engine, wherein the advanced search engine searches the plurality of response reference materials using the set of keywords to identify the set of reference materials.

10. The computing device of claim 7 further comprising:

a network connection, wherein the service request is received from the client via the network connection, and the pre-generated automatic initial response is sent to the client via the network connection.

11. The computing device of claim 7, wherein the plurality of response reference materials comprises at least one of documents, videos, knowledge base articles, community network data or response history data.

12. One or more computer storage media embodying computer executable instructions that, when executed, cause at least one processor to:

receive a service request from a user device;

parse the service request received from the user device to identify a set of keywords;

search a plurality of response reference sources based on the set of keywords to identify at least one suggested solution, the plurality of response reference sources comprising a set of unstructured data materials;

on condition of identifying at least one suggested solution, generate an automatic initial response to the service request, the automatic initial response comprising the at least one suggested solution to resolve an issue associated with the service request;

send the automatic initial response to the user device for display to a user to assist the user in resolving the issue;

on condition of receiving a score from the user device, save the received score with a plurality of other scores, the received score rating a quality of the automatic initial response, the plurality of other scores rating qualities of a plurality of other automatic initial responses;

analyze at least some scores among the plurality of other scores, each of the at least some scores being associated with a same issue as the issue associated with the service request; and modify at least one parameter in a set of parameters associated with an automated support engine based on the analysis of the at least some scores to avoid generating new responses to the same issue, thereby increasing a speed in responding to service requests and reducing processor load.

13. The one or more computer storage media of claim 12, wherein the instructions are further executed to cause the at least one processor to:

on condition of identifying a set of reference materials in the plurality of response reference sources providing information associated with the issue, add at least one link corresponding to the set of reference materials to the automatic initial response.

14. The one or more computer storage media of claim 12, wherein the instructions are further executed to cause the at least one processor to:

retrieve an automatic reply statement; and combine the automatic reply statement and the at least one suggested solution to generate the automatic initial response.

15. The one or more computer storage media of claim 12, wherein the plurality of response reference sources comprises at least one of documents, videos, knowledge base articles, community network data or response history data.

* * * * *